United States Patent [19]

Yamada et al.

[11] Patent Number: 5,365,582
[45] Date of Patent: Nov. 15, 1994

[54] CALL DISTRIBUTING SERVICE SYSTEM FOR A PLURALITY OF TERMINALS

[75] Inventors: Kazuyuki Yamada, Yokohama; Satoshi Takakura, Kawasaki, both of Japan

[73] Assignee: Fujitsu Limited, Kawasaki, Japan

[21] Appl. No.: 844,538

[22] Filed: Mar. 2, 1992

[30] Foreign Application Priority Data

Mar. 1, 1991 [JP] Japan .................................. 3-035831

[51] Int. Cl.[5] ............................................ H04M 3/54
[52] U.S. Cl. .................................... 379/265; 379/211; 379/210
[58] Field of Search ............... 379/265, 266, 211, 196, 379/197, 189, 201, 216, 210, 212

[56] References Cited

U.S. PATENT DOCUMENTS

| | | | |
|---|---|---|---|
| 4,348,554 | 9/1982 | Asmuth | 379/207 |
| 4,737,983 | 4/1988 | Frauenthal et al. | 379/221 |
| 4,797,915 | 1/1989 | Bowker et al. | 379/216 |
| 4,951,310 | 8/1990 | Honda et al. | 379/266 |
| 4,953,204 | 8/1990 | Cuschleg, Jr. et al. | 379/266 |
| 5,144,653 | 9/1992 | Masuoka | 379/113 |
| 5,197,096 | 3/1993 | Sakuma et al. | 379/211 |
| 5,222,120 | 6/1993 | McLeod et al. | 379/88 |

FOREIGN PATENT DOCUMENTS 0340665 11/1989 European Pat. Off. ............ 379/197
0410657 1/1991 European Pat. Off. .

OTHER PUBLICATIONS

M. Efros, et al., *Proceeding of the National Communications Forum*, "Intelligent Network Release O Service Customization", vol. 43, No. 1, Oct. 2, 1989, pp. 354–358.

J. Gechter, et al., *Proceeding of the National Communications Forum*, "ISDN Service Opportunities in the Intelligent Network", vol. 43, No. 2, Oct. 2, 1989, pp. 548–551.

*Primary Examiner*—James L. Dwyer
*Assistant Examiner*—Ahmad F. Matar
*Attorney, Agent, or Firm*—Staas & Halsey

[57] ABSTRACT

In the present invention, a target receiver terminal information storage unit stores a plurality of target receiver terminal numbers corresponding to a plurality of target receiver terminals. The control unit determines idle/busy information stored with a corresponding terminal number as a pair, selects a target receiver terminal number according to a predetermined priority, and outputs the selected number. A sender can thereby automatically call up an appropriate target receiver terminal by dialing a registered receiver identification number. The control unit uses connection information as well as idle/busy information as a determining element in selecting a number. Therefore, a registered number conversion service user can distribute calls to a plurality of target receiver terminals. Besides, the user can select a plurality of target receiver terminal numbers through an inquiry to a switching unit about the idle/busy state without storing idle/busy information or connection information in the storage unit.

14 Claims, 15 Drawing Sheets

LS : LINE SWITCH
SSP : SERVICE SWITCHING POINT
SCP : SERVICE CONTROL POINT
DB : DATABASE

CALL DISTRIBUTING SERVICE SYSTEM FOR A PLURALITY OF TERMINALS

BACKGROUND OF THE INVENTION

The present invention relates to a number conversion service system for converting a dialed number to a receiving telephone number. It can be realized in communication networks such as telephone switching networks.

In communication networks such as telephone switching networks, various types of switching services have been provided through new electronic switching technologies. An intelligent network (IN), capable of providing such switching services, accommodates a data base (DB) 104 for use in each service as shown in FIG. 1, and comprises a service control point (SCP) 103 for controlling all services, a service switching point (SSP) 102 for providing accessing and switching service capabilities for the SCP 103, and a subscriber line switching unit (LS) 101 for accommodating subscribers.

A number conversion service is one of the services provided by such an intelligent network. This service permits a call to be received by a target receiver by dialing an identification number of a registered target receiver without dialing the actual telephone number of the target receiver.

The operational sequence of a conventional number conversion service is described below in association with FIG. 1 (PRIOR ART) and FIG. 2 (PRIOR ART).

STEP 1

Issuing a Call

As shown in FIG. 1, a sender A issues a call by dialing a service access code, SAC, of a number conversion service (for example, SAC=0120) and a registered receiver identification number, UI, of a target receiver B (for example, UI=12345). The SAC and UI numbers are concatenated together (SAC+UI).

STEP 2

Accepting an Issue of a Call

On detecting an issue of a call, the LS 101 relays issue-of-call information to the SSP 102 by interpreting the SAC according to a common call procedure.

STEP 3

Inquiry About a Number

On receiving the SAC+UI from the LS 101, the SSP 102 recognizes a number conversion service by interpreting the SAC, notifies the number conversion service unit in the SCP 103 of a receiver inquiry request, add waits for a response. Thus, the SSP 102 performs a service access function.

STEP 4

Converting a Number

On receiving a receiver inquiry, the SCP 103 accesses a number conversion table 201 as shown in FIG. 2 which is stored in the DB 104 connected to the SCP 103. A directory number, DN, (for example, DN=044-754-4089) corresponding to each combination of SAC+UI is stored in the number conversion table 201. The SCP 103 reads a corresponding DN by accessing the number conversion table 201 according to received SAC+UI, and then notifies the SSP 102 of the DN as a receiver's telephone number.

STEP 5

Relay

Referring again to FIG. 1, according to the DN provided by the SCP 103, the SSP 102 relays a call from the sender A to the LS 101 to accommodate receiving terminals. Thus, the SSP 102 acts as a switching unit.

STEP 6

Receiving a Call

After converting a number, a call is normally processed by the LS 101 on the receiving side. When a target terminal is idle, a ringing tone is raised. A ringback tone is simultaneously sent to the sender A. When a target terminal is busy, a busy tone is raised.

In this number conversion service, as shown in FIG. 2, a dialed number corresponds to a receiver telephone number. Therefore, a dialed number is always converted to a registered receiver's telephone number regardless of the state of a target terminal, and a call receiving process is performed for the telephone number.

Accordingly, in the conventional one-to-one number conversion service described above, a call is rejected when a receiving terminal is busy. The sender then waits until the terminal becomes idle, often resulting in poor service.

SUMMARY OF THE INVENTION

The present invention aims at providing improved services for senders with the minimum number of unsuccessful calls by enabling a plurality of receiver's telephone numbers to be connected. Additionally, the invention provides good service for a registered number conversion service user by distributing calls among a plurality of terminals.

The present invention relates to a number conversion service in which a switching unit permits a call from a user to be received by a corresponding target receiver terminal by converting a user-specified service access code and a registered receiver identification number to a target receiver terminal number.

The present invention has a configuration comprising a target receiver terminal information storage unit and a control unit. The target receiver terminal information storage unit stores, for each registered receiver identification number, plural sets of a target receiver terminal number and its idle/busy, information. The idle/busy information indicates the idle/busy state for a plurality of target receiver terminals. The control unit selects, based on a predetermined priority from the target receiver terminal information storage unit according to the user-specified service access code and registered receiver identification number, one of the target receiver terminal numbers in the idle state according to the idle/busy information. Additionally, the control unit outputs the selected number to a switching unit and updates idle/busy information stored by the target receiver terminal information storage unit according to the idle/busy state of each target receiver terminal.

With this configuration, a sender may automatically call up an appropriate target receiver terminal based on the priority by dialing only one registered receiver identification number.

As a result, the present invention provides improved services to senders, reducing, to a minimum, number of unsuccessful calls by enabling a plurality of receiver's telephone numbers to be selectively called up. The present invention also provides better service to a registered number conversion service user by distributing a call to a plurality of terminals.

BRIEF DESCRIPTION OF THE DRAWINGS

Other objects and features of the present invention may easily be recognized by referring to the attached drawings and description of the preferred embodiments of the present invention.

DESCRIPTION OF THE PREFERRED EMBODIMENTS

Explanation of the Principle

The present invention relates to a number conversion service system. The present invention permits a call from a user to be received by a target receiver terminal, through a switching unit, by converting a user-dialed (specified) service access code and registered receiver identification number to a target receiver terminal number in a communication network.

Figure 3:
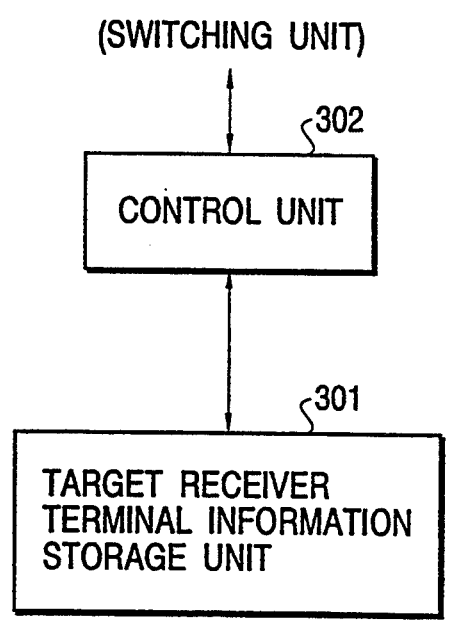
FIG. 3 is a block diagram for explaining the principle of the present invention.

FIG. 3 is a block diagram for explaining the principle of the present invention. As shown in FIG. 3, the present invention comprises a target receiver terminal information storage unit 301 and a control unit 302. These units are provided in an exclusive service controller (service control point) 103 connected to a switching unit, for example. In the alternative, that may be included as functions in the switching unit.

The first aspect of the present invention may be configured as follows.

First, the target receiver terminal information storage unit 301 stores, for each registered receiver identification number, plural sets of a target receiver terminal number and its idle/busy information indicating the idle/busy state.

Then, according to a user-issued service access code and a registered receiver identification number, the control unit 302 selects from the target receiver terminal information storage unit 301, based on a predetermined priority (for example, in the memory address order), one of the target receiver terminal numbers whose idle/busy information indicates "idle". The control unit 302 then outputs the selected number to a switching unit. According to the idle/busy state of each target receiver terminal, the control unit 302 updates the idle/busy information stored in the target receiver terminal information storage unit.

The second aspect of the present invention has the following configuration.

First, the target receiver terminal information storage unit 301 stores, for each registered receiver identification number, plural sets of a target receiver terminal number, its idle/busy information indicating the idle/busy state, and connection information indicating the connection state of the corresponding terminal. The connection information contains, for example, the maximum number of call connections for each target receiver terminal in a predetermined time period, the actual number of call connections in a predetermined time period, and the connection rate. The connection rate is the ratio of the actual number of connections to the maximum number.

Then, according to a user-issued service access code and a registered receiver identification number, the control unit 302 selects, from the target receiver terminal information storage unit 301, one of the target receiver terminal numbers whose idle/busy information indicates "idle" based on the connection information stored with the corresponding target receiver terminal number as a pair. Then, the control unit 302 outputs the selected number to a switching unit. That is, from among the target receiver terminal numbers whose idle/busy information indicates "idle", a number indicating the smallest connection rate is selected and outputted to a switching unit. Simultaneously, according to the idle/busy state and the connection state of each target receiver terminal, the control unit 302 updates the idle/busy information and the connection information stored in the target receiver terminal information storage unit. That is, the idle/busy information which is stored with a target receiver terminal number as a pair, the connection number, and the connection rate are updated. Then, according to the idle/busy state and the connection state of a target receiver terminal, the idle/busy information, the actual number of connections, and the connection rate, all of which are stored in the target receiver terminal information storage unit, are updated.

The third aspect of the present invention has the following configuration.

First, the target receiver terminal information storage unit 301 stores for each registered receiver identification number, a plurality of target receiver terminal numbers each corresponding to a plurality of target receiver terminals. In this case, the idle/busy information, etc. is not required.

Then, according to a user-issued service access code and a registered receiver identification number, the control unit 302 selects from the target receiver terminal information storage unit 301 one of the target receiver terminal numbers based on the next selection information. Then, the control unit 302 outputs the selected number to a switching unit. If the control unit 302 is notified by the switching unit side of the busy state of the outputted target receiver terminal number, another target receiver terminal number is selected and outputted, and the next selection information is updated.

In the third aspect of the present invention, a communication unit is provided to receive from the switching unit side a notification that the outputted target receiver terminal number described above is "busy".

The configuration of the fourth aspect of the present invention is described as follows.

First, the target receiver terminal information storage unit 301 stores, for a plurality of target receiver terminals, plural sets of a target receiver terminal number and its idle/busy information indicating the idle/busy state.

Next, according to a user-issued service access code, a registered receiver identification number, and the user's sending area information, the control unit 302 selects the target receiver terminal information storage unit 301 corresponding to a predetermined group related to a predetermined registered receiver identification number. Then, the control unit 302 selects, from the above described storage unit 301, one of the target receiver terminal numbers whose idle/busy information indicates the idle state according to a predetermined priority. The control unit 302 outputs the selected number to a switching unit, and updates the idle/busy information stored in the target receiver terminal information storage unit 301 according to the idle/busy state of each target receiver terminal.

The present invention has the following configuration in its fifth aspect.

Figure 1:
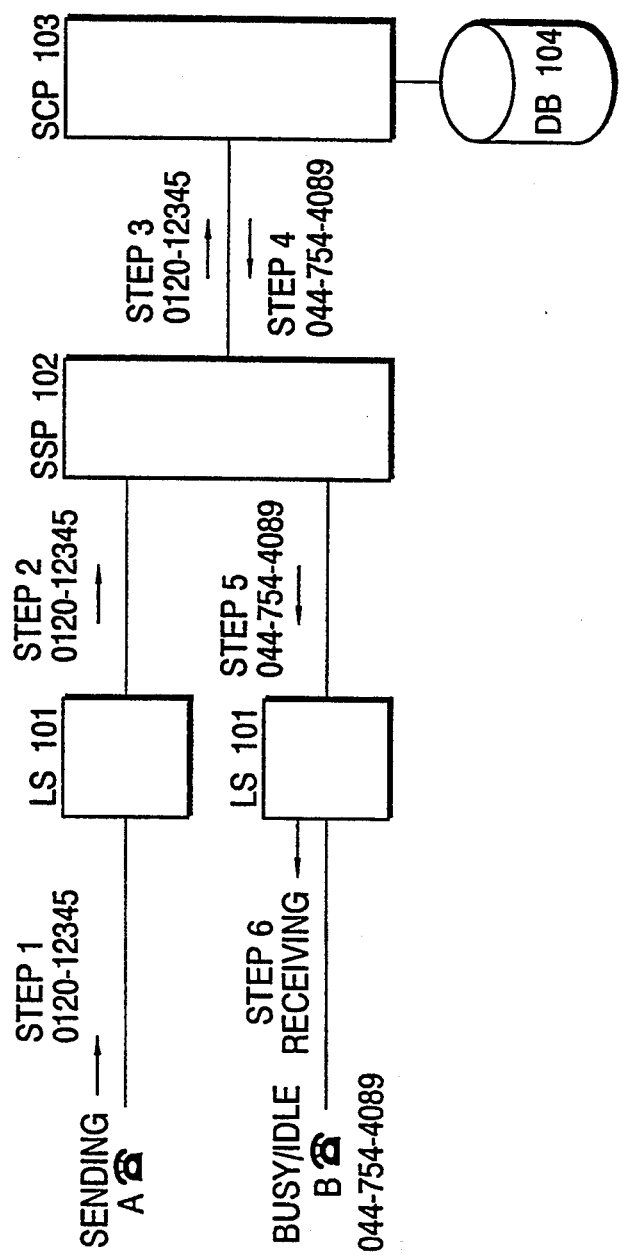
FIG. 1 (PRIOR ART) shows a configuration for explaining a common intelligent network.
Figure 2:
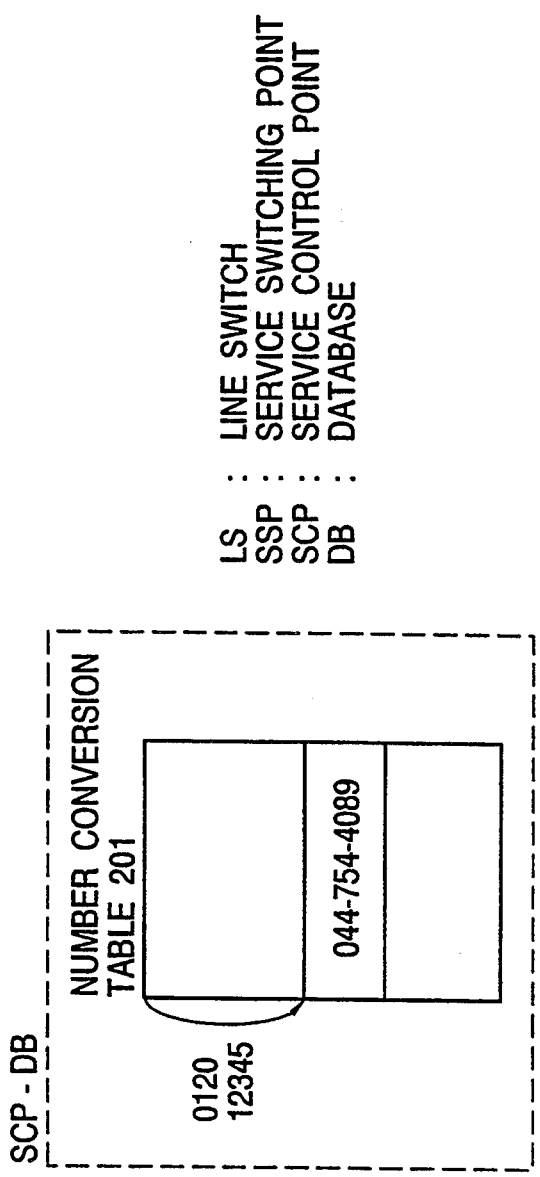
FIG. 2 (PRIOR ART) illustrates a common data base conversion table as used in a common system as shown in FIG. 1.

First, the fifth aspect includes a maximum connection number determiner, not shown in FIG. 1, for determining the maximum number of call connections which may be made in a target receiver terminal within a predetermined time period based on one or more of the present date, the day of the week, and the time period.

The target receiver terminal information storage unit 301, as in the second aspect, stores for each registered receiver identification number plural sets of a target receiver terminal number, its idle/busy information indicating the idle/busy state of the corresponding terminal, and connection information indicating the connection state of the corresponding terminal. Specifically, the connection information is stored as the actual number of call connections made within a predetermined time period associated with a target receiver terminal corresponding to the registered receiver identification number containing the connection information.

The control unit 302 selects from the target receiver terminal information storage unit 301 one of the target receiver terminal numbers whose idle/busy information indicates the idle state, according to the actual number of connections stored as pairs with the corresponding target receiver terminal number and to the maximum number of connections determined by the maximum connection number determiner. Then the control unit outputs the selected number to a switching unit.

As indicated in the configurations of the above described first to fifth aspects of the present invention, the target receiver terminal information storage unit 301 stores a plurality of target receiver terminal numbers corresponding to a plurality of target receiver terminals.

In the first aspect of the present invention, the control unit 302 determines idle/busy information stored in the storage unit 301 with a terminal number as a pair, selects one target receiver terminal number based on a predetermined priority, and then outputs the selected number to a switching unit. Thus, a sender can automatically call an appropriate target receiver terminal according to a predetermined priority only by dialing a registered receiver identification number.

In the second aspect of the present invention, the control unit 302 uses idle/busy information and connection information as determination elements in selecting a target receiver terminal number. Therefore, calls to be received can be selectively distributed among a plurality of target receiver terminal numbers at the request of a registered number conversion service user. Further, and a call is prevented from concentrating on a low reception capacity terminal.

In the third aspect of the present invention, a plurality of target receiver terminal numbers are selected in response to an idle/busy inquiry to a switching unit side, and an automatic reception by a plurality of terminals can be thus realized without retaining idle/busy information.

In addition, in the fourth aspect of the present invention, according to a user-issued service access code, a registered receiver identification number, and user's sending area information, the control unit 302 selects the target receiver terminal information storage unit 301 in a predetermined group related to a predetermined registered receiver identification number. Therefore, each user may connect a call to the receiver's telephone number nearest the sender's area by registering it to the target receiver terminal information storage unit 301 corresponding to each group a receiver's telephone number near the sender's area corresponding to each group.

In the fifth aspect of the present invention, as in the second aspect, a target receiver terminal number is selected according to the connection information. In this case, the connection information contains the actual number of call connections made to a corresponding target receiver terminal within a predetermined time period and the maximum number of call connections made to a corresponding target receiver terminal within a predetermined time period. The maximum number of connections can be determined based on one or more of the present date, the day of the week, and the time period. Therefore, a target receiver can be changed based on one or more of the present date, the day of the week, and the time period.

Explanation of the Preferred Embodiments

The preferred embodiment of the present invention is explained in detail by referring to drawings.

First, the general configuration of the preferred embodiment of the present invention is the same as that of a common intelligent network shown in FIG. 1. The feature of the preferred embodiment of the present invention resides in the configuration of the SCP 103 and the internal data configuration of the DB 104.

Figure 4:
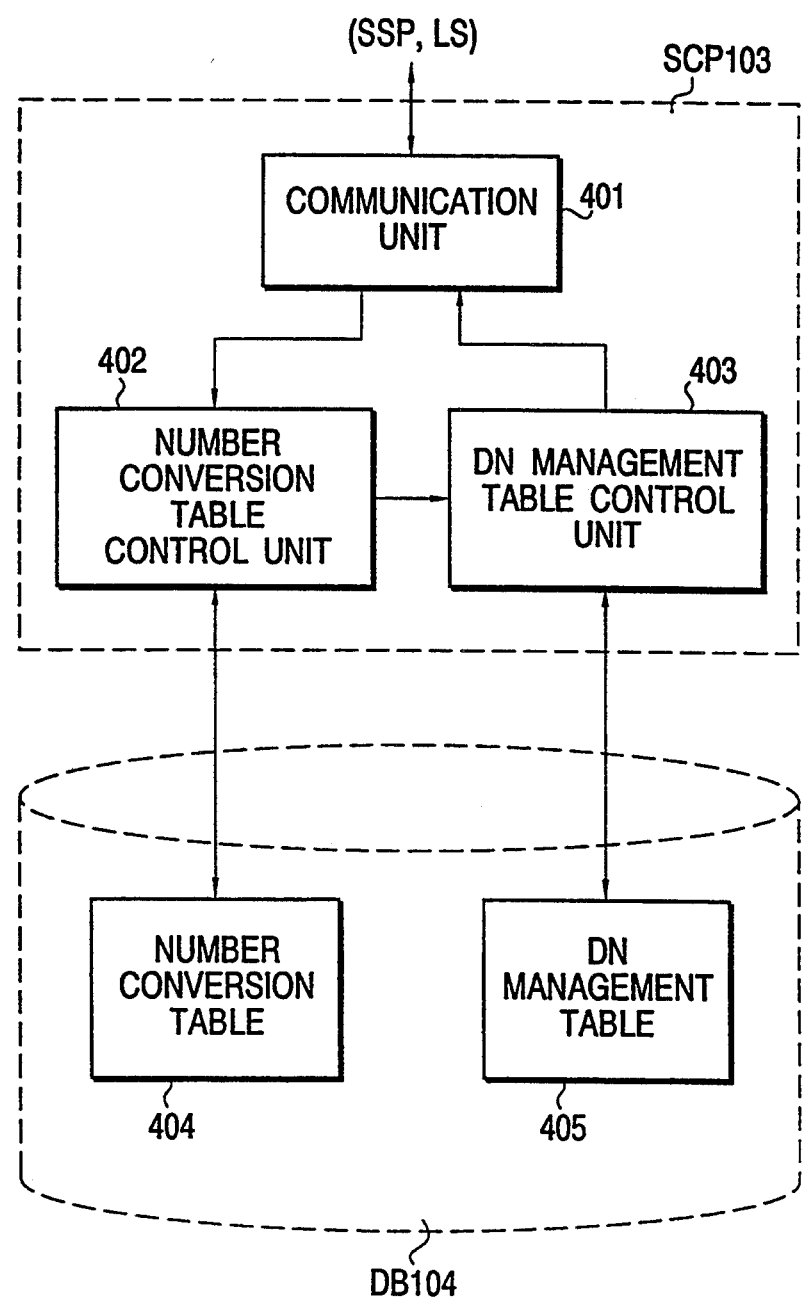
FIG. 4 shows the configuration of a preferred embodiment of the present invention.

FIG. 4 shows the configuration of the SCP 103 and the DB 104 shown in FIG. 1 of the preferred embodiment of the present invention.

The preferred embodiment comprises a number conversion table 404 and a directory number (DN) management table 405 in the DB 104. Each registered number conversion service user can register a plurality of directory numbers DN in the DN management table 403.

In the SCP 103, a communication unit 401 sends and receives control information to and from the SSP 102 and the LS 101 (refer to FIG. 1). The number conversion table controller 402 accesses the number conversion table 404 in the DB 104, reads the information in the DN management table 405, and notifies the DN management table controller 403 of the information.

The DN management table controller 403 accesses the DN management table in the DB 104 according to the information provided by the number conversion table controller 402, and performs a control by normally selecting one of a plurality of DNs. The selection information is provided to and from the communication unit 401 to the receiving LS 101 (refer to FIG. 1) through the SSP 102.

Figure 5:
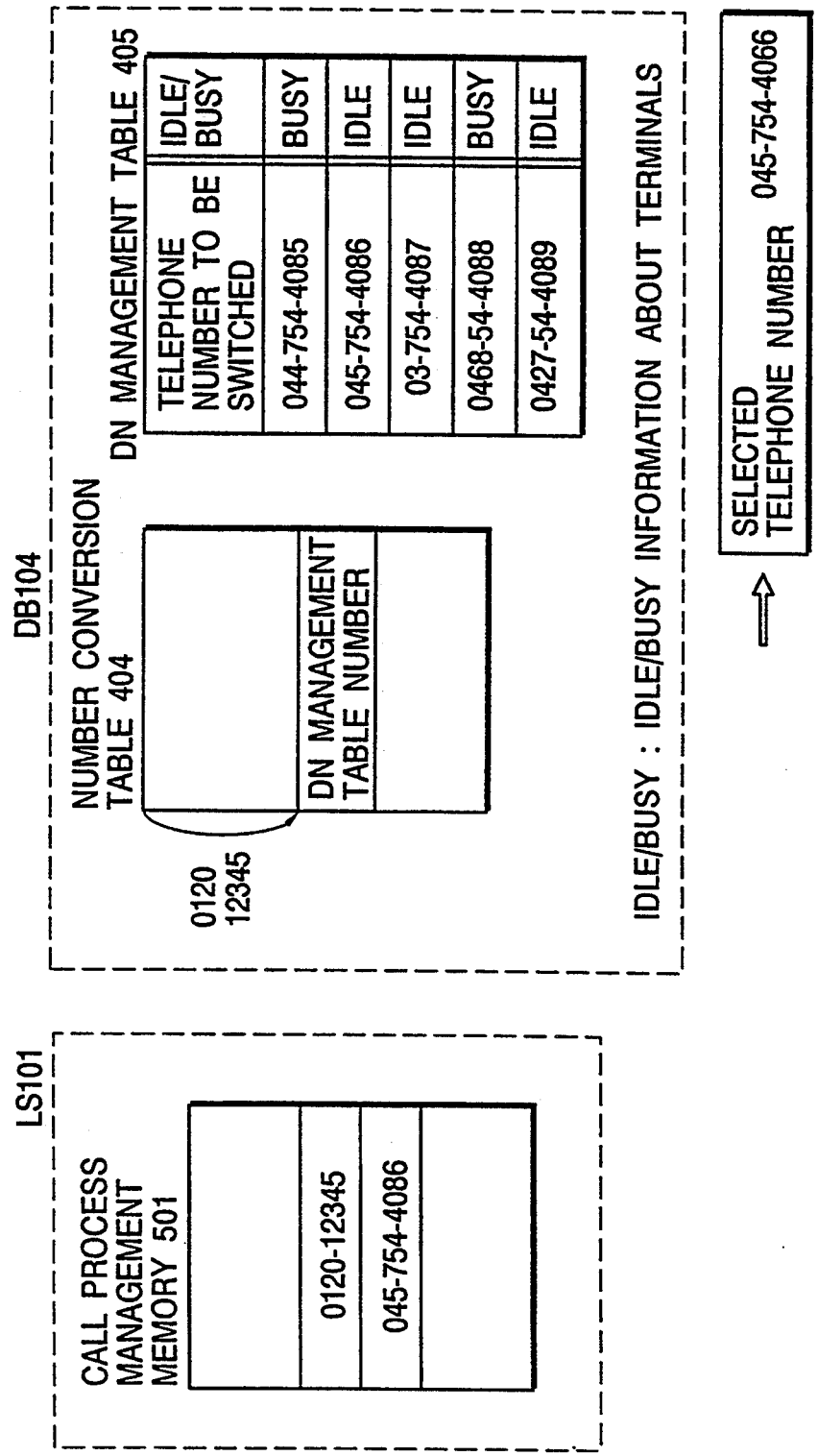
FIG. 5 shows a data configuration of the first preferred embodiment.

FIG. 5 shows the data configuration of the first preferred embodiment of the number conversion service system based on the configuration shown in FIG. 4.

First, the number conversion table 404 in the DB 104 stores a DN management table number corresponding to an access code, that is, a combination of a service access code SAC of a number conversion service (for example, SAC=0120) and a registered receiver identification number UI of a target receiver (for example, UI=12345).

Each DN management table 405 in the DB 104 stores a plurality of directory numbers, DN, (telephone number to be switched) registered by each registered number conversion service user. Idle/busy information is added to each DN.

The DN management table 405 is accessed by the DN management table controller 403 shown in FIG. 4. The DN management table controller 403 controls the selection of the DNs such that the DN having the highest priority of the DNs stored in the DN management table 405 can receive a call. In the present invention, a DN having a higher priority is stored at a higher order in a table. Therefore, the DN management table controller 403 sequentially determines the idle/busy state of each terminal starting from a higher order address in the DN management table 405, and selects the first-detected idle DN.

A call process management memory 501 as shown in FIG. 5 is provided in each LS 101 (refer to FIG. 1).

An operational sequence from a sender's dialing to call reception and communication termination in the above described first preferred embodiment is described in association with FIGS. 3 and 4.

STEP 1

Issuing a Call

Figure 6:
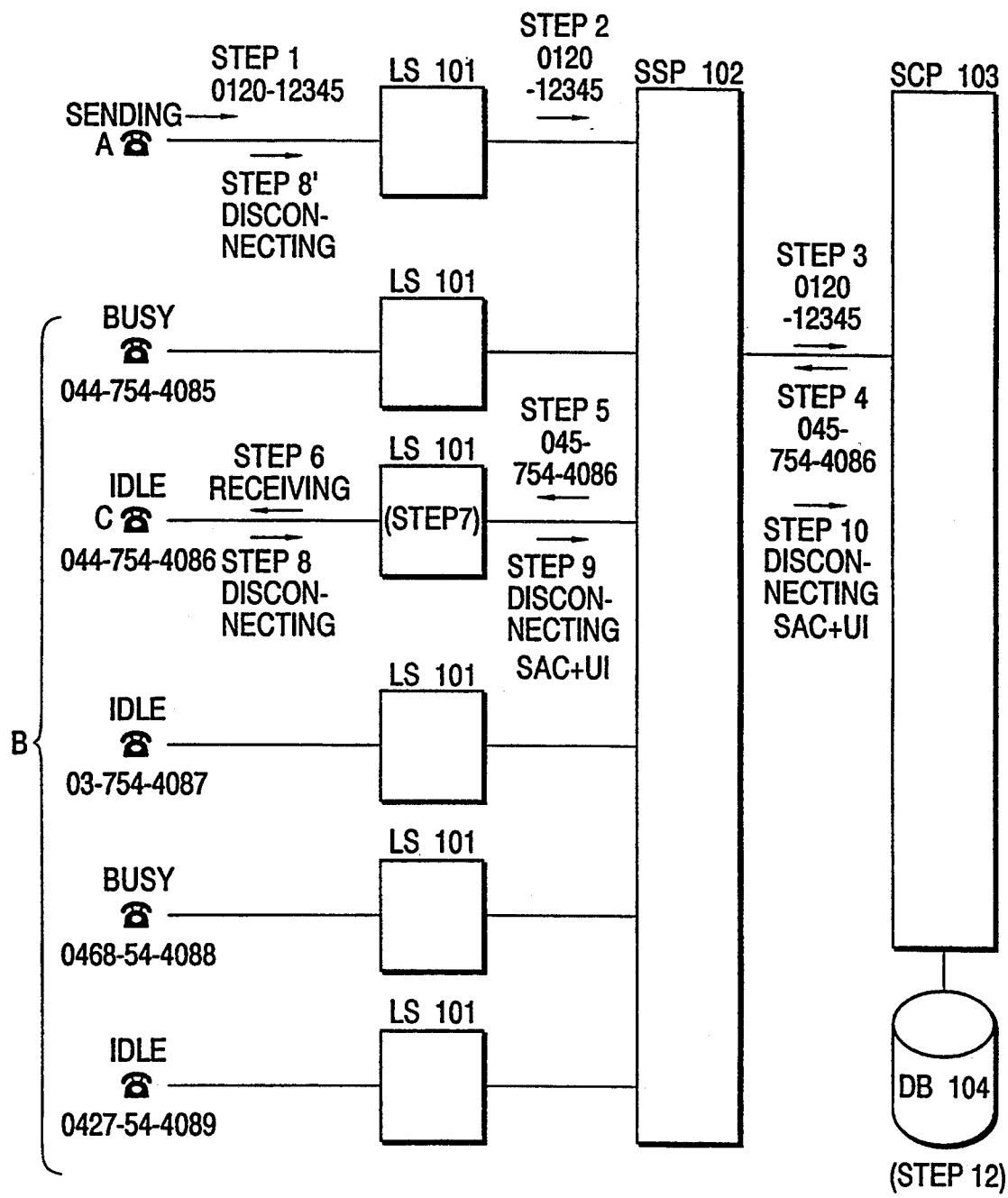
FIG. 6 shows an operational view for explaining the first and second embodiments.

As shown in FIG. 6, a sender A issues a call by dialing a service access code SAC of a number conversion service (for example, SAC=0120) and a registered receiver identification number UI of a target receiver B (for example, UI=12345).

STEP 2

Accepting an Issue of a Call

On detecting an issue of a call, the LS 101 relays issue-of-call information to the SSP 102 according to the common call procedure by interpreting the SAC.

STEP 3

Inquiry About a Number

On receiving the SAC+UI from the LS 101, the SSP 102 recognizes a number conversion service by interpreting the SAC, notifies, using SAC+UI, the number conversion service unit in the SCP 103 of a receiver inquiry request, and waits for a response.

STEP 4

Converting a Number

On receiving a receiver inquiry request, the communication unit 401 (shown in FIG. 4) in the SCP 103 notifies the number conversion table controller 402 of the above described SAC+UI.

The controller accesses the number conversion table 404 in the DB 104 using the SAC+UI, and notifies the DN management table controller 403 of the DN management table number.

The DN management table controller 403 accesses a corresponding DN management table 405 in the DB 104. After sequentially determining idle/busy information, starting from a higher order address in the table, the DN management table controller selects an idle DN and notifies the SSP 102 of the selected DN in the form of a receiver's telephone number.

STEP 5

Relay

According to the DN provided by the SCP 103, the SSP 102 relays a call from a sender A to the LS 101 to accommodate a receiving terminal.

STEPS 6 and 7

Receiving a Call

After converting a number, a call is normally processed in the LS 101 on the receiving side and received by a corresponding terminal C. A dial number (SAC+UI=0120-12345) and a receiver's telephone number (DN=044-754-4086) are simultaneously recorded in the call process management memory 501 for the terminal C provided in the LS 101.

STEPS 8, 9, and 10

Terminating Communication

When either a sender A or a receiving terminal C disconnects the communication, the LS 101 which accommodates the terminal C deletes a corresponding dial number SAC+UI and a receiver's telephone number DN from the call process management memory 501. The SSP 102 gives a disconnection notification to the SCP 103.

On receiving a disconnection notification, the communication unit 401 in the SCP 103 sends the received SAC+UI and DN to the DN management table controller 403.

According to these two numbers, the controller accesses the DN management table 405 in the DB 104, and sets idle/busy information for a corresponding address to "idle".

According to the first preferred embodiment of the number conversion service system described in the sequence above, a sender can automatically call an appropriate registered receiver terminal based on a predetermined priority by dialing a registered receiver identification number UI.

When a call is normally received by each terminal, the LS 101 notifies the SCP 103 through the SSP 102 of the reception. Then the DN management table controller 403 shown in FIG. 4 retrieves the DN management table 405 and sets the idle/busy state of the receiver's telephone numbers having the same address to "busy".

Figure 7:
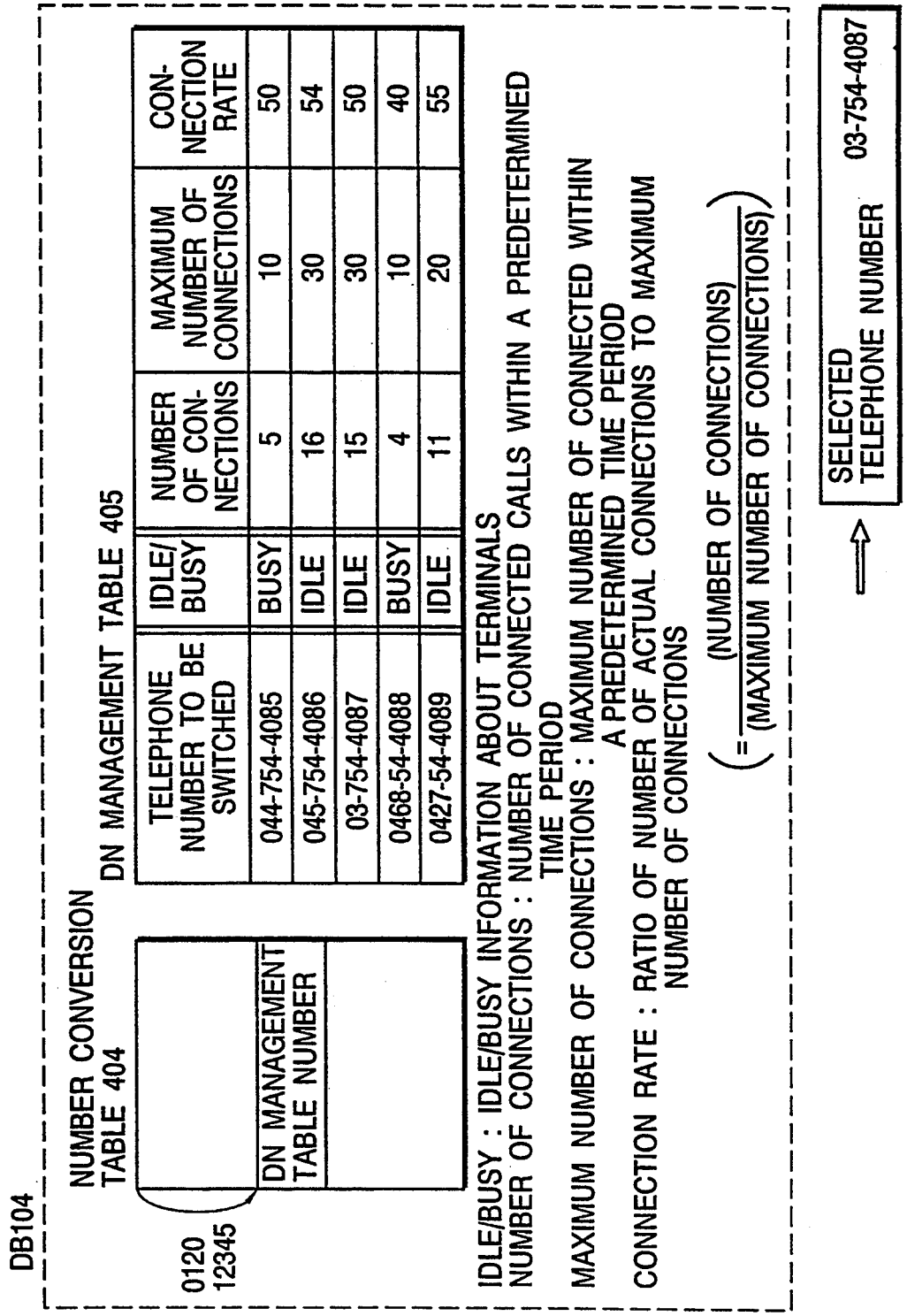
FIG. 7 shows a data configuration of the second preferred embodiment.

FIG. 7 shows a data configuration of the second preferred embodiment of a number conversion service system based on the configuration shown in FIG. 4. The basic operational sequence is the same as that of the first preferred embodiment shown in FIG. 6.

In the second preferred embodiment shown in FIG. 7, the configuration of the DN management table 405 of the DB 104 is different from that of the first preferred embodiment shown in FIG. 5. That is, in the configuration shown in FIG. 7, number-of-connection information for distributing a load is given in addition to the idle/busy information shown in FIG. 5. Thus, a call to be received can be selectively distributed to a plurality of receiver's telephone numbers at the request of a registered number conversion service user.

As shown in FIG. 7, the number-of-connection information comprises for each telephone number to be switched (DN) the maximum number of connections which can be made within a predetermined time period, the actual number of calls connected within a predetermined time period, and the connection rate.

The connection rate can be calculated by dividing the actual number of connections by the maximum number of connections as shown in FIG. 7. This shows the ratio of the number of actual connections to the maximum number of connections made to a receiving terminal of each DN within a predetermined time period. The connection rate of each DN is updated by the DN management table controller 403, shown in FIG. 4, each time a receiving terminal corresponding to a DN is made.

Using the above described DN management table 405, the DN management table controller 403 shown in FIG. 4 selects a DN having the smallest connection rate of the idle DNs in the DN management table 405 in the number converting process in STEP 4 as shown in FIG. 6. Then, the SSP 102 notifies the LS 101 of the selected DN as a receiver's telephone number.

According to the notification, a call can be assigned to an appropriate terminal depending on the maximum number of connections determined for each receiving terminal, thus preventing concentration of calls reception by a terminal having a small reception capacity.

When all idle DNs indicate the same connection rate, the DN management table controller 403 operates such that the DN having the largest maximum number of connections can be selected. When all DNs have the same maximum number of connections, loads are evenly distributed to each receiving terminal.

Figure 8:
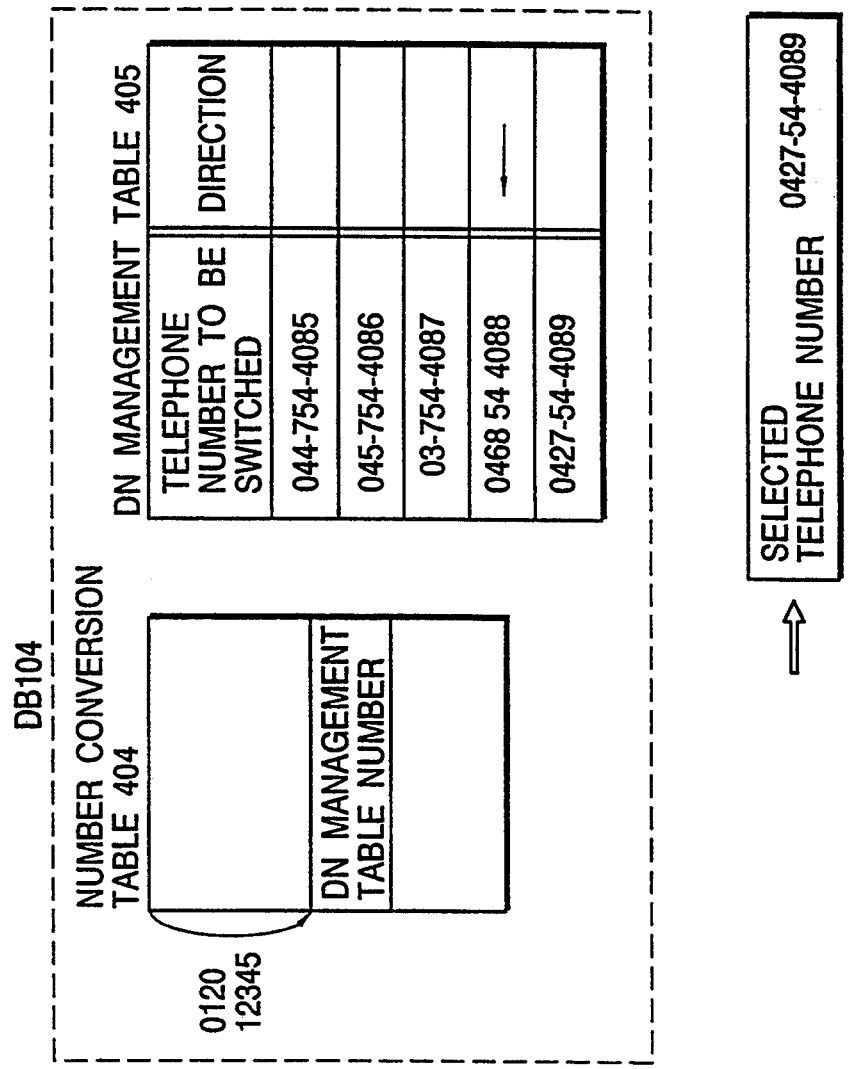
FIG. 8 shows a data configuration of the third preferred embodiment.

FIG. 8 shows a data configuration of the third preferred embodiment of a number conversion service system based on the configuration shown in FIG. 4. In the first and second preferred embodiments described in association with FIGS. 5–7, idle/busy information is provided in the DN management table 405. In the third preferred embodiment shown in FIG. 8, the idle/busy information is not provided in the DN management table 405. Besides, the call process management memory 01 in the LS 101 of a receiving terminal does not have to store a dial number SAC+UI. Only the next selection pointer for pointing to the DN to be selected next is provided in the DN management table 405.

Figure 9:
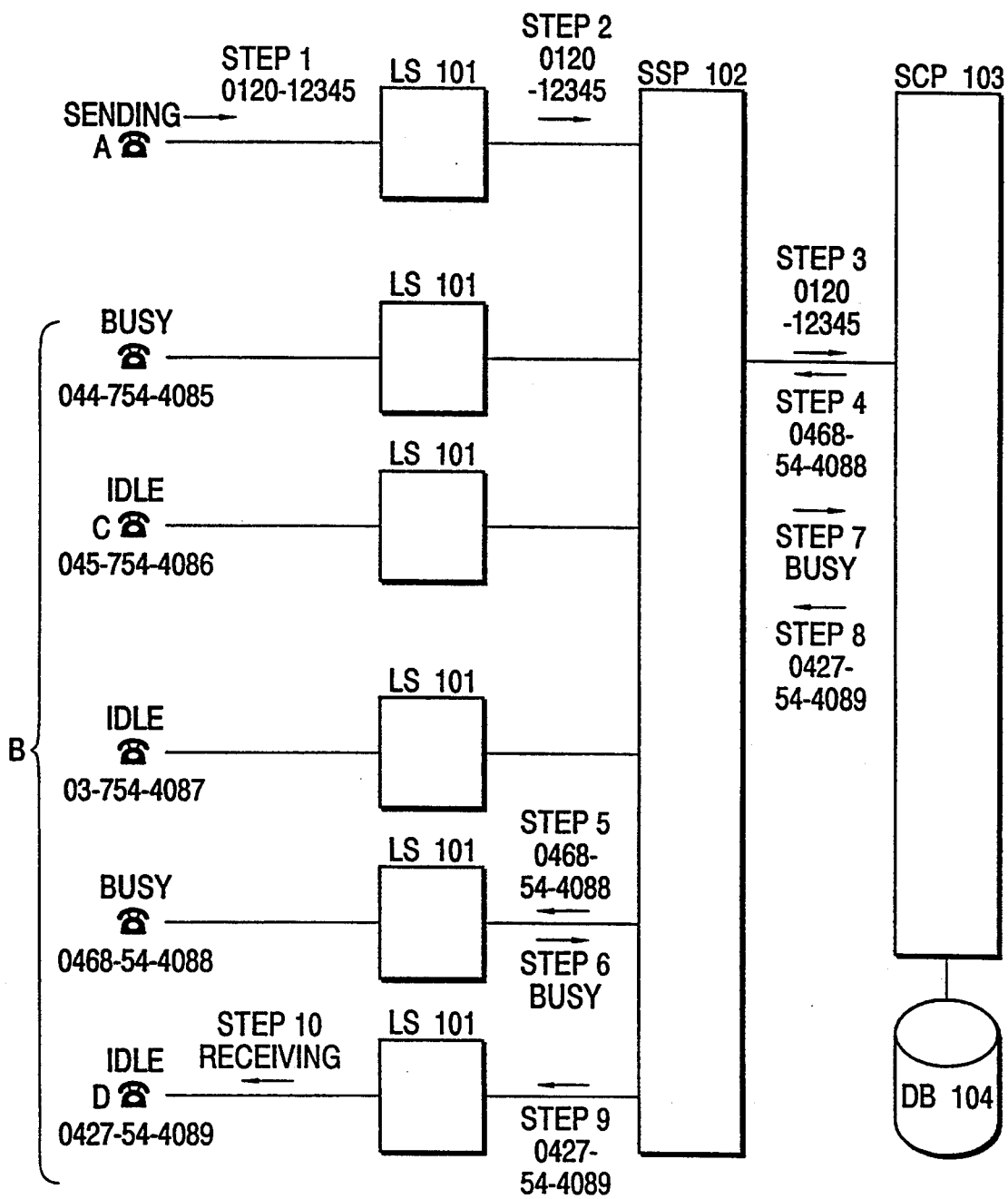
FIG. 9 shows an operational view for explaining the third preferred embodiment.

An operational sequence from a sender's dialing to call reception and communication termination in the above described third preferred embodiment is described in association with FIG. 9.

Each operation in issuing a call in STEP 1, in receiving a call in STEP 2, and in inquiring a number in STEP 3 is the same as that in the first and second preferred embodiments shown in FIG. 6.

STEP 4

Converting a Number

On receiving a receiver inquiry request, the communication unit 401 (FIG. 4) in the SCP 103 notifies the number conversion table controller 402 of the above described SAC+UI.

According to the SAC+UI, the controller accesses the number conversion table 404 in the DB 104, and notifies the DN management table controller 403 of the DN management table number.

The DN management table controller 403 accesses a corresponding DN management table 405 in the DB 104. Then, a next selection pointer points to a DN to be selected from the same table, and notifies the SSP 102 of the selected DN as a receiver's telephone number. The DN management table controller 403 updates the address pointed by the next selection pointer. The update can be realized as a movement of the next selection pointer to the next address.

STEP 5

Relay

According to the DN provided by the SCP 103, the SSP 102 relays a call from a sender A to the LS 101 for accommodating a receiving terminal.

STEPS 6–10

Receiving a Call After Repeating the Conversion of a Number in Response to "Busy" Information After converting a number, a call is normally processed by the LS 101 on the receiving side. When a receiving terminal is busy, a busy notification is given to the SCP 103 through the SSP 102.

The notification is sent to the DN management table controller 403 through the communication unit 401 shown in FIG. 4. In response to the busy notification, the controller selects the DN specified by the next selection pointer from among the DNs in the DN management table 405. The selected DN is provided for the SSP 102 as a receiver's telephone number, and the pointing address of the next selection pointer is updated.

When a terminal corresponding to the selected DN is determined to be idle by the LS 101 after repeating busy information and converting numbers, the call is received by the terminal.

A call can be thus received automatically by a plurality of terminals without idle/busy information. Since idle/busy information is not managed in this method, a disconnection notification is not required from the LS 101 to the SCP 103 at the end of communication.

Figure 10:
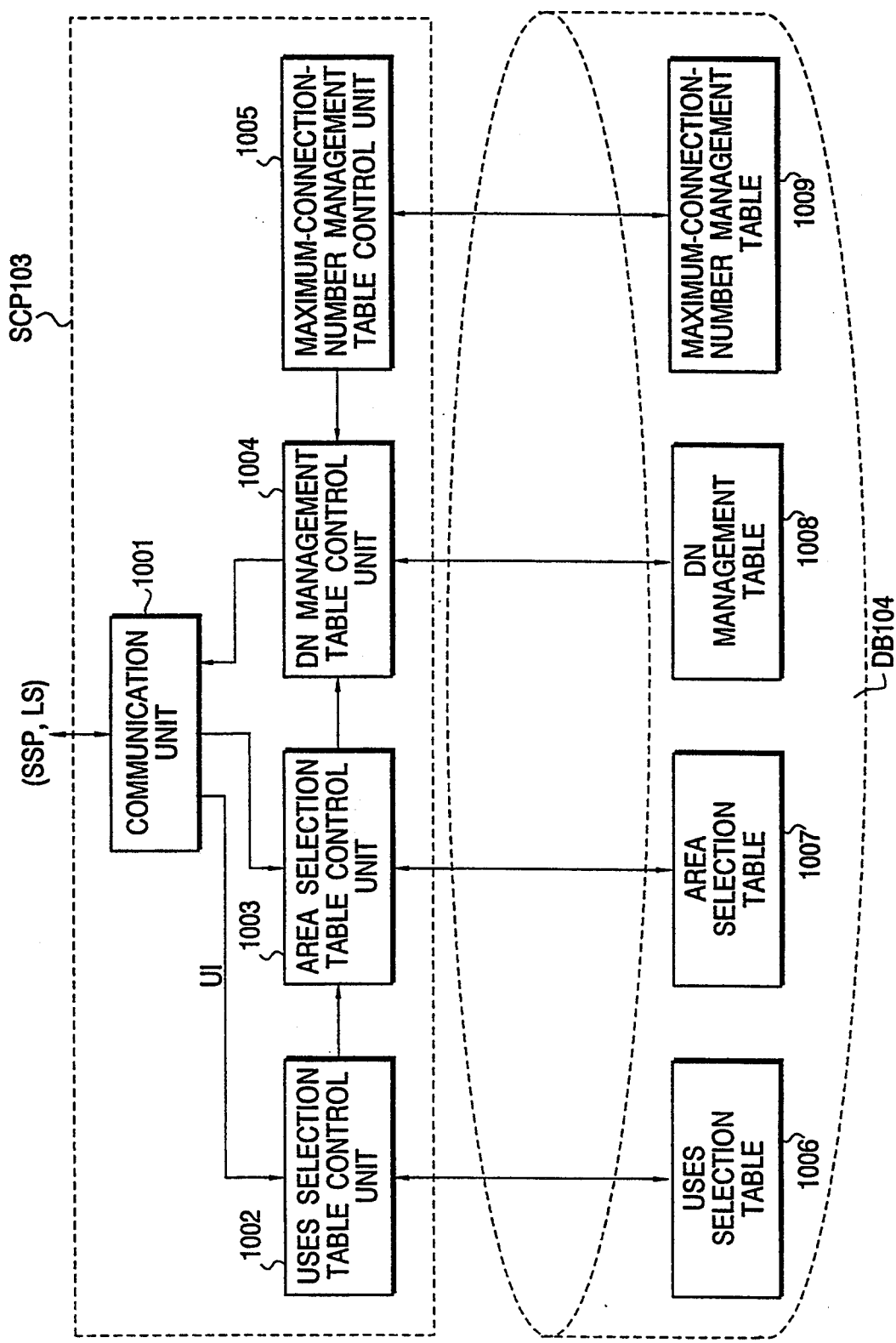
FIG. 10 shows a configuration for explaining the fourth preferred embodiment.
Figure 11:
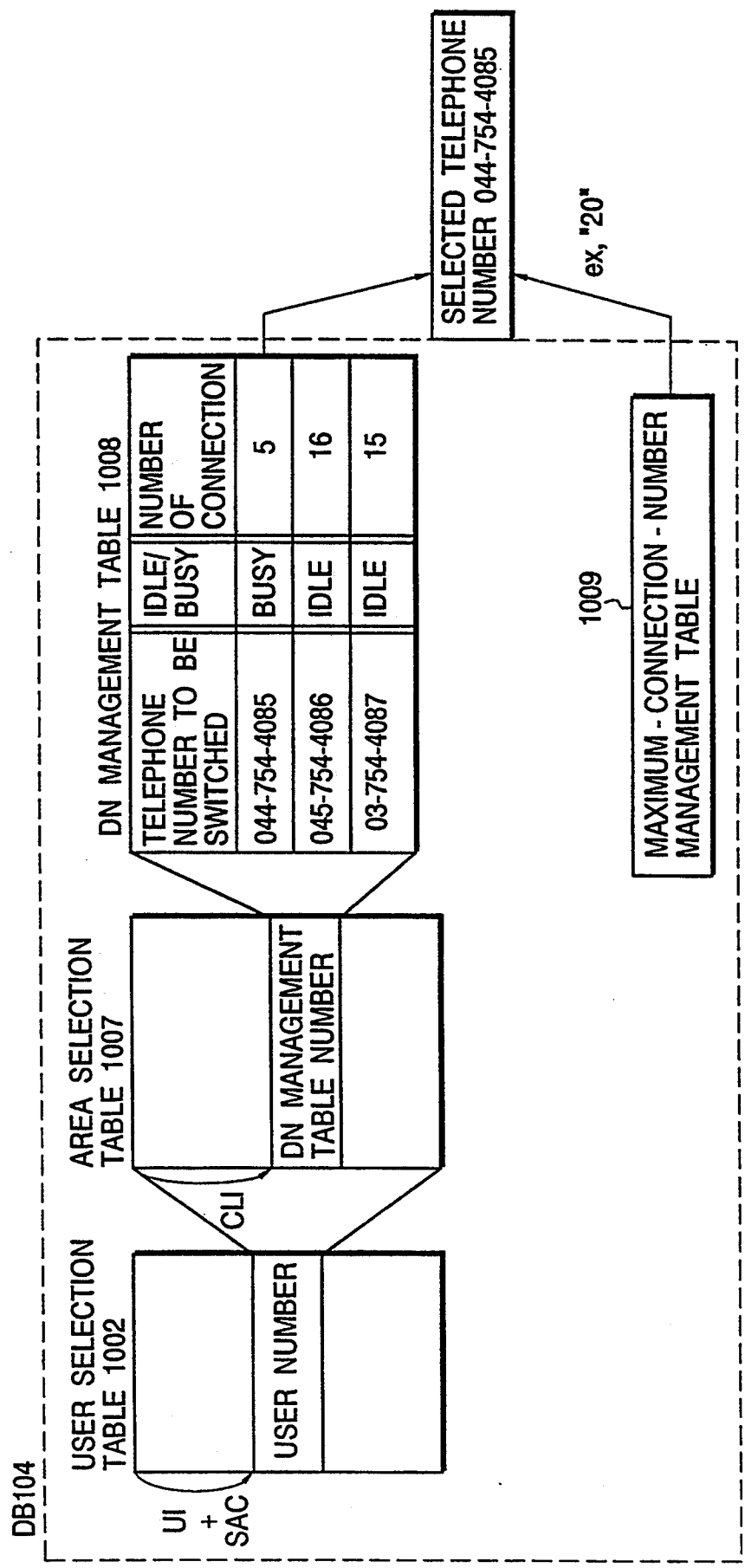
FIG. 11 shows a data configuration for explaining the fourth preferred embodiment.

FIG. 10 shows the configuration of the SCP 103 and the DB 104. FIG. 11 shows a data configuration of the number conversion service system based on the configuration of the fourth preferred embodiment shown in FIG. 10.

In the fourth preferred embodiment, a call can be connected to a receiver's telephone number nearest to the sender's area in response to the sender's call.

The DB 104 comprises a user selection table 1006, an area selection table 1007, a DN management table 1008, and a maximum connection number management table 1009. In the SCP 103, the communication unit 1001 transmits control information between the SSP 102 and the LS 101 (FIG. 1).

First, the user selection table 1006 provided in the DB 104 stores a user number corresponding to an access code, that is, a combination of a service access code SAC of a number conversion service (for example, SAC=0120) and a registered receiver identification number UI of a target receiver (for example, UI=12345).

The user selection table control unit 1002 reads user area information by accessing the user selection table 1006 in the DB 104 according to the registered receiver identification number UI received by the communication unit 1001, and it gives the information to the area selection table control unit 1003.

Next, the area selection table 1007 in the DB 104 is selected according to the user number selected from the user selection table 1006 by the user selection table control unit 1002. That is, the area selection table 1007 is provided for each user area corresponding to each user number. The area selection table 1007 stores a DN management table number corresponding to a sender's area identification number CLI.

Figure 12:
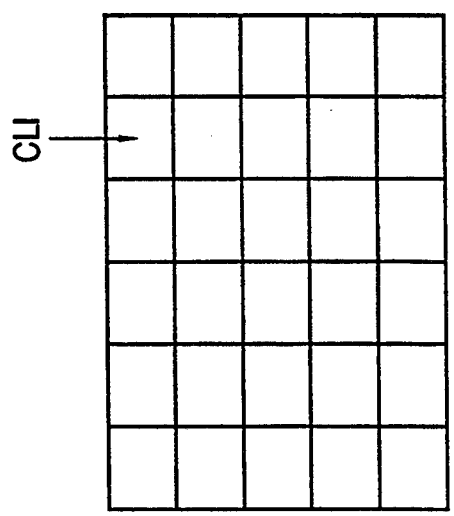
FIG. 12 shows a view for explaining an area selecting operation.

The information about the area where a user sends a call can be transmitted as a sender area identification number CLI from the LS 101 (FIG. 1) for accommodating users. The sender area identification number CLI is assigned to the LS 101 of each area after it is geographically divided, as shown by the left block in FIG. 12. In this preferred embodiment, the divided areas are assigned group names A to F, for example, as shown by the right block in FIG. 12. Each user is associated with a group, and a DN management table 1008 is assigned to each group. Therefore, each user can connect a call to the receiver's telephone number nearest to the sender's area by registering to the DN management table 1008 corresponding to each group a receiver's telephone number near the area corresponding to the sender area identification number CLI related to the group.

The area selection table 1007 performs the above described grouping for each sender area identification number CLI. That is, the area selection table 1007 assigns each sender area identification number CLI to a DN management table number corresponding to one of the groups A-F shown in FIG. 12, for example.

The area selection table control unit 1003 reads the information in the DN management table 1008 corresponding to the sender's area by accessing the area selection table 1007 in the DB 104 according to sender area identification number CLI received by the communication unit 1001, and it gives the information to the DN management table control unit 1008.

Next, a DN management table 1008 in the DB 104 is selected according to the DN management table number selected from the area selection table 1007 by the area selection table control unit 1003. The DN management table 1008 stores a plurality of directory numbers DN (telephone numbers to be converted) registered by each registered number conversion service user. As in the second preferred embodiment of the present invention, idle/busy information indicating the idle/busy state of a terminal and the number of call connections made within a predetermined time period are added to each DN.

Figure 13:
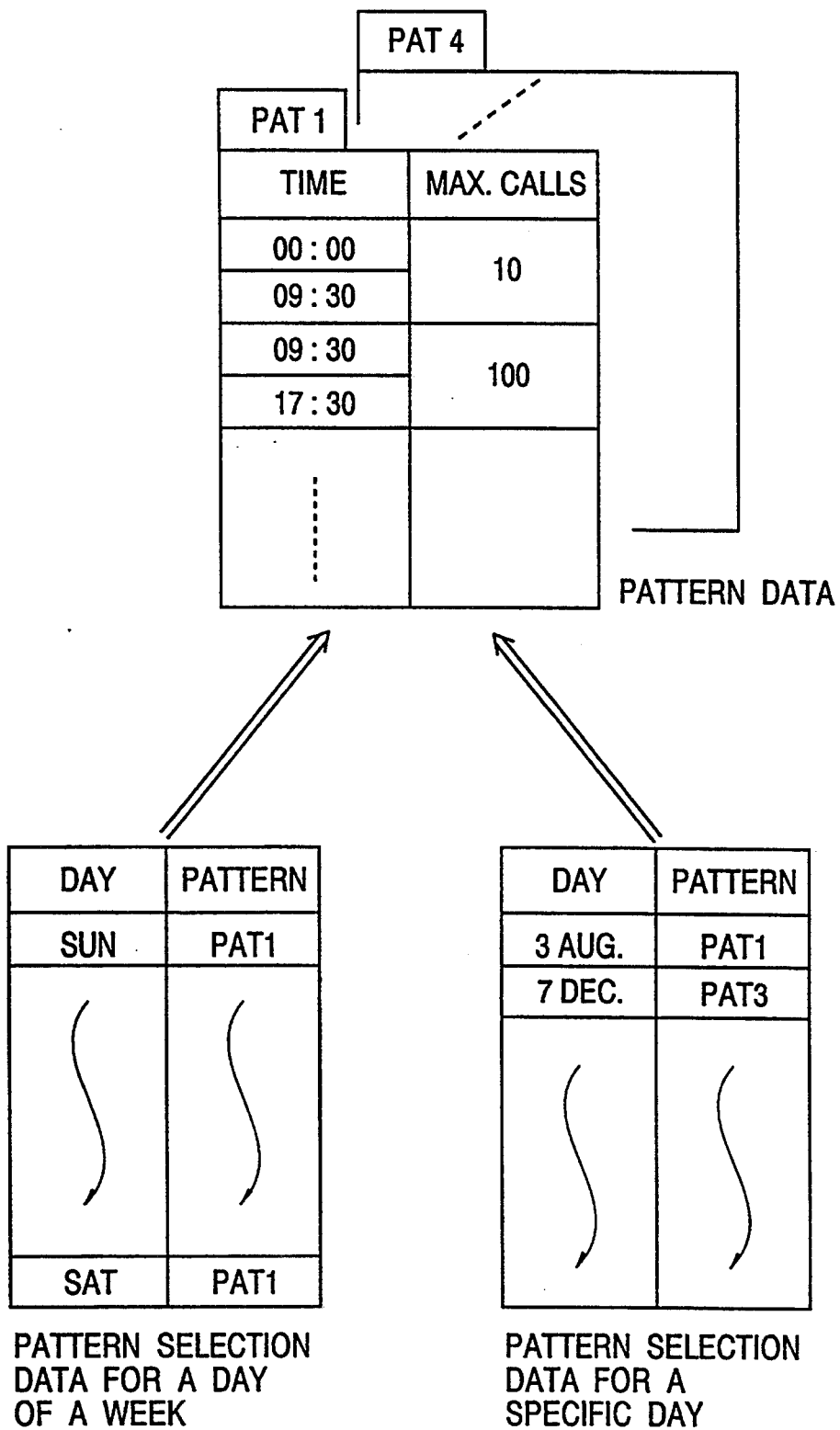
FIG. 13 shows a data configuration of the maximum connection number management table.

The maximum number of connections is the same for all DNs and is selected from the maximum connection number management table 1009 by the maximum connection number management table control unit 1005. Then it is given to the DN management table control unit 1004. The configuration of the maximum connection number management table 1009 is shown in FIG. 13.

A plurality of patterns in pattern data PAT 1-PAT 4, for example, are set in the maximum connection number management table 1009 with the maximum number of connections defined for each time period. In the maximum connection number management table 1009, pattern selection data groups for a specific date are assigned any of the above described pattern data for specific days such as national holidays. Likewise, in the maximum connection number management table 1009, pattern selection data groups for each day of the week are assigned any of the above described pattern data for each day of the week.

The maximum connection number management table control unit 1005 determines whether or not the present date is registered for pattern selection data for a specific day. If yes, the pattern for the date is read, and the maximum number of connections corresponding to the present time period is read from the pattern data corresponding to the pattern. This control unit reads the pattern corresponding to the present day of a week from the pattern selection data for each day of the week if the present date is not registered for pattern selection data for a specific day. Then, the above described control unit notifies the DN management table control unit 1004 of the maximum number of connections read as described above.

The DN management table control unit 1004 accesses the DN management table 405 in the DB 104 according to the DN management table number provided by the area selection table control unit 1003, and selects a telephone number to be switched indicating the idle information. Next, the above described control unit reads from the DN management table 1008 the number of connections associated with the selected telephone number to be switched and subtracts the above described number of connections from the maximum number of connections informed by the maximum connection number management table control unit 1005 in order to obtain the number of idle connections of each telephone number to be switched. Then, the above described control unit selects the telephone number currently having the largest number of idle connections, and notifies from the communication unit 1001 the LS 101 on the receiving side of the selected number through the SSP 102 (shown in FIG. 1).

Figure 14:
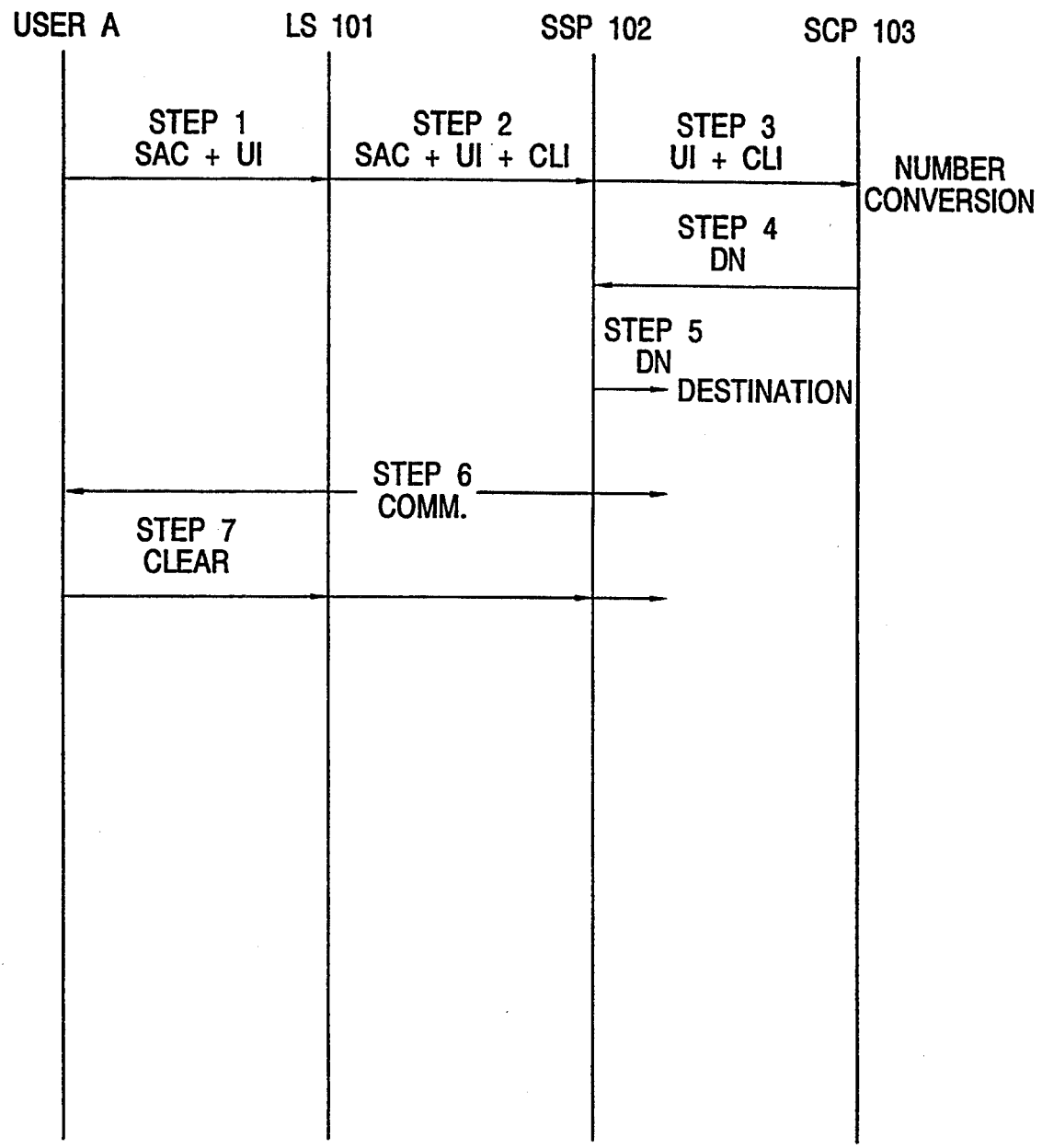
FIG. 14 shows a view for explaining the operation of the fourth preferred embodiment.

An operational sequence from a sender's dialing to a call reception and a communication termination in the above described fourth preferred embodiment is described in association with FIG. 14.

STEP 1

Issuing a Call

In FIG. 14, a user (sender) A issues a call by dialing a service access code SAC of a number conversion service and a registered receiver identification number UI of a target receiver B.

STEP 2

Accepting an Issue of a Call

On detecting an issue of a call, the LS 101 relays issue-of-call information to the SSP 102 according to the common call procedure by interpreting the SAC. In this case, the LS 101 notifies the SSP 102 of the sender area identification number CLI exclusively assigned to the LS 101 together with the above described service access code SAC and the registered receiver identification number UI of a target receiver B.

STEP 3

Inquiry About a Number

On receiving the SAC+UI+CLI from the LS 101, the SSP 102 recognizes a number conversion service by interpreting the SAC, notifies using SAC+UI+CLI the number conversion service unit in the SCP 103 of a receiver inquiry request, and waits for a response.

STEP 4

Converting a Number

On receiving the inquiry about a receiver, the SCP 103 selects a directory number DN (telephone number to be switched) according to the registered receiver identification number UI and the sender area identification number CLI. Then, it notifies the SSP 102 of the selected number as a receiver's telephone number.

STEP 5

Relay and Reception of a Call

According to the DN provided by the SCP 103, the SSP 102 relays a call from a sender A to the LS 101 for accommodating a receiving terminal. After converting a number, a call is normally processed in the LS 101 on the receiving side and received by a corresponding terminal C. If a call is received successfully, the SCP 103 is informed through the SSP 102. Then busy information is set at the corresponding address in the DN management table 1008 and the number of connections is updated.

STEP 6

Communication

As described above, communication is made between the sender A and the receiver.

STEP 7

Termination of Communication

When either a sender A or a receiver disconnects the communication, a disconnecting process is performed in the normal call control sequence. On receiving a disconnection notification, the SCP 103 accesses the DN management table 405 in the DB 104, and sets idle information at the corresponding address.

According to the fourth preferred embodiment of the number conversion service system indicated in the above described sequence, a call can be received by the receiver's telephone number nearest to the sender's area, and the call charge can thus be reduced.

Figure 15:
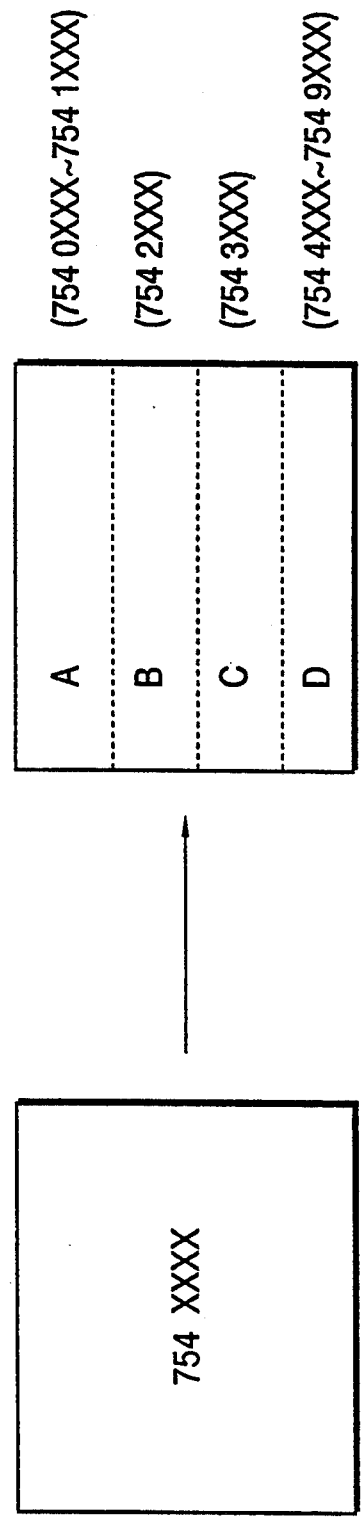
FIG. 15 shows a view for explaining the embodiment concerning its operation other than the area selecting operation.

The above described fourth preferred embodiment is configured such that the DN management table 1008 can be selected from the area selection table 1007 by the sender area identification number CLI from the LS 101. If the DN management table 1008 must be grouped in smaller segment units than in sender area identification number CLI units, the sender's telephone number should be notified to the SCP 103 from the LS 101 through the SSP 102. For example, telephone numbers can be grouped based on their 4 low order digits as shown by A, B, C, and D in FIG. 15.

In the fourth preferred embodiment, the maximum number of connections which is common among directory numbers DN is set according to the date, the day of the week, and the time period. In addition, the maximum number of connections can be set for each directory number DN according to the date, the day of the week, and the time period.

Additionally, a different DN management table 1008 can be selected according to the date, the day of the week, and the time period.

The above described first to fourth preferred embodiments enable a target receiver to receive a call in a telephone switching network by dialing a predetermined identification number of a registered receiver without directly dialing a telephone number of a target receiver. However, the present invention is not limited to this kind of network. The present invention can be widely applied to general communication networks such as facsimile communication networks, data communication networks using packet switching networks, communication networks for assigning taxis, etc., and driver service communication networks.

What is claimed is:

1. A call distributing service system for a plurality of terminals in a number conversion service having a plurality of target receiver terminals and a plurality of target receiver terminal numbers, in which at least one switching unit permits calls from users to be received by corresponding target receiver terminals by converting user-specified registered receiver identification numbers to corresponding target receiver terminal numbers, said service system comprising;

target receiver terminal information storing means for registering, as numbers, a plurality of said target receiver terminals, and storing, for each user-specified registered receiver identification number, plural sets of each said corresponding target receiver terminal number, and idle/busy information indicating an idle/busy state of the corresponding target receiver terminal for said corresponding target receiver terminals; and control means for selecting, based on a predetermined priority, from said target receiver terminal information storing means according to a selected one of said user-specified registered receiver identification numbers, one of said target receiver terminal numbers corresponding to one of said target receiver terminals indicated as in the idle state according to said idle/busy information, outputting said selected target receiver terminal number to one of said switching units, and updating said idle/busy information stored by said target receiver terminal information storing means according to the idle/busy state of each said corresponding target receiver terminal.

2. A call distributing service system for a plurality of terminals according to claim 1, wherein said target receiver terminal information storing means stores each said target receiver terminal number at an address; and said control means selects, from said target receiver terminal information storing means in an ascending order of addresses, one of said target receiver terminal numbers corresponding to one of said target receiver terminals indicated as in the idle state according to idle/busy information.

3. A call distributing service system for a plurality of terminals according to claim 1, wherein
said control means is provided in an exclusive service process unit separate from said switching units, for switching said calls from said users, said exclusive service process unit being accessed by a service access code issued by one of said users; and
said target receiver terminal information storing means is a data base storage unit connected to said exclusive service process unit.

4. A call distributing service system for a plurality of terminals in a number conversion service having a plurality of target receiver terminals and a plurality of target receiver terminal numbers, in which at least one switching unit permits calls from users to be received by corresponding target receiver terminals by converting user-specified registered receiver identification numbers to corresponding target receiver terminal numbers, said service system comprising:
target receiver terminal information storing means for storing, in correspondence, for each said user-specified registered receiver identification number, plural sets of each said corresponding target receiver terminal number, idle/busy information indicating an idle/busy state of the corresponding target receiver terminal, and connection information indicating a connection state of said corresponding target receiver terminal, for said plurality of target receiver terminals; and
control means for selecting, based on said connection information stored in correspondence with said corresponding target receiver terminal number, from said target receiver terminal information storing means, according to a selected one of said user-specified registered receiver identification numbers, one of said target receiver terminal numbers, whose said corresponding target receiver terminal is indicated as in the idle state according to said idle/busy information, outputting said selected target receiver terminal number to one of said switching units, and updating said idle/busy information and said connection information, stored by said target receiver terminal information storing means, according to the idle/busy state and connection state of each said corresponding target receiver terminal.

5. A call distributing service system according to claim 4, wherein
said connection information includes a preselected value indicating a maximum number of call connections which may be made within a predetermined time period, a value indicating an actual number of call connections which were made within said predetermined time period, and a connection rate value indicative of a ratio of said actual number of connections to said maximum number of connections made within said predetermined time period; and
said control means selects, from said target receiver terminal information storing means, a target receiver terminal number having the smallest connection rate stored in a pair among said target receiver terminal numbers indicated as in the idle state according to said corresponding idle/busy information; outputs said selected target receiver terminal number to said one of said switching units; updates said idle/busy information, the actual number of connections value, and the connection rate value, each said value stored in correspondence with said selected target receiver terminal number; and updates said idle/busy information, said actual number of connections value, and said connection rate value stored by said target receiver terminal information storing means according to said idle/busy state and said connection state of each said target receiver terminal.

6. A call distributing service system according to claim 4, wherein
said control means is provided in an exclusive service process unit separate from any of said switching units for switching said calls from said users, said exclusive service process unit being accessed by a service access code issued by one of said users; and
said target receiver terminal information storing means is a data base storage unit connected to said exclusive service process unit.

7. A call distributing service system for a plurality of terminals in a number conversion service having a plurality of target receiver terminals and a plurality of target receiver terminal numbers, in which at least one switching unit permits calls from users to be received by corresponding target receiver terminals by converting user-specified registered receiver identification numbers to corresponding target receiver terminal numbers, said service system comprising:
target receiver terminal information storing means for storing, for each of said user-specified registered receiver identification numbers, a plurality of each said target receiver terminal number corresponding to said target receiver terminals;
control means for selecting, based on next selection pointing information which corresponds to a directory of numbers related to said target receiver terminals, one of said target receiver terminal numbers from said target receiver terminal information storing means, according to a selected one of said user-specified registered receiver identification numbers, outputting said selected target receiver terminal number to said one of said switching units, updating said next selection pointing information, and repeating said selecting and outputting of said next target receiver terminal number, and updating said next selection pointing information; and
communication means for receiving a notification signal that said target receiver terminal, as indicated by said target receiver terminal number output, supplied by said target receiver terminal information means, is busy.

8. A call distributing service system for a plurality of terminals according to claim 7, wherein
said control means and said communication means are provided in an exclusive service process unit separate from said switching unit for switching said calls from said users, said exclusive service process unit being accessed by a service access code issued by one of said users; and
said target receiver terminal information storing means is a data base storage unit connected to said exclusive service process unit.

9. A call distributing service system in a number conversion service having a plurality of target receiver terminals and a plurality of target receiver terminal numbers, in which at least one switching unit permits calls from users, each said user having a corresponding user sending area, to be received by at least one corresponding target receiver terminal by converting user-specified registered receiver identification number to corresponding target receiving terminal numbers, said service system comprising:

a plurality of target receiver terminal information storing means for storing, for a group comprised of at least one of said user-specified registered receiver identification numbers, plural sets of each said corresponding target receiver terminal numbers and idle/busy information, said idle/busy information indicating an idle/busy state of said corresponding target receiver terminal, for said at least one corresponding target receiver terminals; and control means for selecting one of said target receiver terminal information storing means from a predetermined receiver group related to a predetermined one of said user-specified registered receiver identification numbers, according to said corresponding one of said user-specified registered receiver identification number, and information indicative of said corresponding user sending area of one of said users, for selecting according to a predetermined priority from said target receiver terminal information storing means, one of said target receiver terminal numbers whose idle/busy information indicates an idle state of said target receiver terminal, for outputting said selected target receiver terminal number to one of said switching units, and for updating, according to said idle/busy state of said corresponding target receiver terminal, said corresponding idle/busy information stored in said corresponding target receiver terminal information storing means.

10. A call distributing service system according to claim 9, wherein said control means is provided in an exclusive service process unit separate from said one of said switching units for switching said calls from said users, said exclusive service process unit being accessed by a service access code issued by one of said users; and said target receiver terminal information storing means is a data base storage unit connected to said exclusive service process unit.

11. A call distributing service system for a plurality of terminals according to claim 4, further comprising maximum connection number determining means for determining for each of said target receiver terminals, a maximum number of call connections made within a predetermined time period according to at least one of the present date, the day of the week, and the time period; and wherein said connection information includes the number of call connections made within a predetermined time period to one of said target receiver terminals corresponding to the selected one of said user-specified registered receiver identification numbers containing said connection information; and said control means selects from said target receiver terminal information storing means, one of said target receiver terminal numbers whose corresponding idle/busy information indicates said idle state of said target receiver terminals according to said number of connections stored as said target receiver terminal numbers and according to said maximum number of call connections, and outputs said selected target receiver terminal number to a switching unit.

12. A call distributing service system for a plurality of terminals in a number conversion service having a plurality of target receiver terminals and a plurality of target receiver terminal numbers, in which at least one switching unit permits calls from users to be received by at least one corresponding target receiver terminal by converting user-specified registered receiver identification numbers to corresponding target receiver terminal numbers, said service system comprising:

target receiver terminal information storing means, for storing for each of said user-specified registered receiver identification numbers plural sets of each said target receiver terminal numbers corresponding to said target receiver terminals; and control means for selecting, from said target receiver terminal information storing means according to a selected one of said user-specified registered receiver identification number, one of said target receiver terminal numbers and outputting said selected target receiver terminal number to said one of said switching units.

13. A call distributing service system for a plurality of terminals in a number conversion service having a plurality of target receiver terminals and a plurality of target receiver terminal numbers, in which at least one switching unit permits calls from users to be received by corresponding target receiver terminals by converting user-specified registered receiver identification numbers to corresponding target receiver terminal numbers, said service system comprising:

target receiver terminal information storing means for storing, for each said user-specified registered receiver identification number, idle/busy information indicating an idle/busy state of the corresponding target receiver terminal for said target receiver terminals; and control means for selecting, based on a predetermined priority, from said target receiver terminal information storing means according to a selected one of said user-specified registered receiver identification numbers, one of said target receiver terminal numbers corresponding to one of said target receiver terminals indicated as being in the idle state according to said idle/busy information, outputting said selected target receiver terminal number to said one of said switching units, collecting said idle/busy information of each said target receiver terminal from said switching unit accommodating said target receiver terminal, and updating said idle/busy information stored by said target receiver terminal information storing means according to said idle/busy information of each said corresponding target receiver terminal.

14. A call distributing service system for a plurality of terminals in a number conversion service having a plurality of target receiver terminals and a plurality of target receiver terminal numbers, in which at least one switching unit permits calls from users to be received by corresponding target receiver terminal by converting user-specified registered receiver identification numbers to corresponding target receiver terminal numbers, said service system comprising:

target receiver terminal information storing means for storing, for each said user-specified registered receiver identification number, plural sets of each said corresponding target receiver terminal number, and idle/busy information indicating an idle/busy state of the corresponding target receiver terminal for each said target receiver terminals; and control means for selecting, based on a predetermined priority, from said target receiver terminal information storing means according to a selected one of said user-specified registered receiver identification numbers, one of said target receiver terminal numbers corresponding to one of said target receiver terminals indicated as in the idle state according to said idle/busy information, outputting said selected target receiver terminal number to one of said switching units, updating said idle/busy information corresponding to each of said target receiver terminals, stored in said target receiver terminal information storing means to indicate a busy state of said target receiver terminal, by receiving from said one switching unit, which accommodates each of said target receiver terminals, a reception notification that a normal call is received by each of said target receiver terminals, and updating said idle/busy information corresponding to each of said target receiver terminals stored in said target receiver terminal information storing means to indicate an idle state of said target receiver terminal, by receiving from said one switching unit, which accommodates each of said target receiver terminals, a termination notification that said normal call is terminated by each of said target receiver terminals.

* * * * *

UNITED STATES PATENT AND TRADEMARK OFFICE
CERTIFICATE OF CORRECTION

PATENT NO. : 5,365,582
DATED : November 15, 1994
INVENTOR(S) : K. Yamada et al

It is certified that error appears in the above-indentified patent and that said Letters Patent is hereby corrected as shown below:

Column 1, line 55, delete "add" and insert --and--.

Column 3, line 63, delete "that" and insert --they--.

Column 7, line 3, delete "403" and insert --405--.

Column 17, line 5, delete "number" and insert --numbers--.

Signed and Sealed this

Twenty-first Day of March, 1995

Attest:

BRUCE LEHMAN

*Attesting Officer*     *Commissioner of Patents and Trademarks*